United States Patent [19]

Cavanaugh et al.

[11] 4,107,037

[45] Aug. 15, 1978

[54] METHOD AND APPARATUS FOR AUTOMATIC CONTROL OF FILTRATE QUALITY

[75] Inventors: Robert J. Cavanaugh, Ponca City; Robert L. Coffee, Newkirk; Dell Conley; Howard H. Ferrell, both of Ponca City, all of Okla.

[73] Assignee: Continental Oil Company, Ponca City, Okla.

[21] Appl. No.: 837,117

[22] Filed: Sep. 28, 1977

[51] Int. Cl.² .............................................. B01D 23/24
[52] U.S. Cl. ..................................... 210/82; 137/501; 138/42; 210/90
[58] Field of Search .................................. 210/79–82, 210/85, 90; 137/501; 138/42

[56] References Cited

U.S. PATENT DOCUMENTS

| 3,490,561 | 1/1970 | Colgan | 138/42 |
| 3,675,772 | 7/1972 | Zhukovsky et al. | 210/90 |
| 3,677,300 | 7/1972 | King | 138/42 |

Primary Examiner—Frank Sever
Attorney, Agent, or Firm—Cortlan R. Schupbach, Jr.

[57] ABSTRACT

A sidestream of injection liquid taken downstream of a filter is passed through a monitoring filter of appropriate pore size. Pressure drop over the monitoring filter is determined and a regeneration cycle for the main filter is triggered in response to differential pressure ($\Delta P$) over a preset value, which corresponds to deterioration in filtrate quality.

14 Claims, 1 Drawing Figure

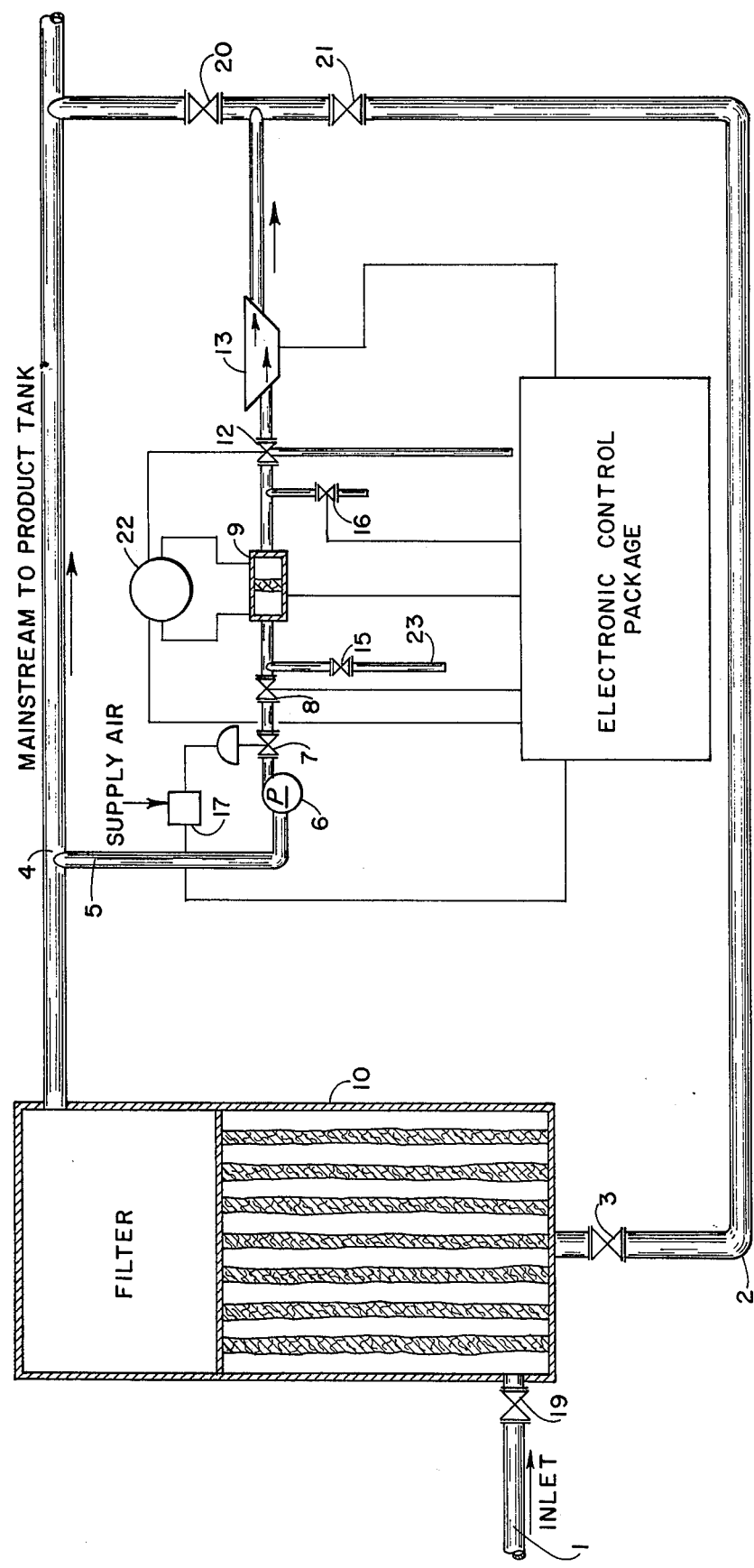

METHOD AND APPARATUS FOR AUTOMATIC CONTROL OF FILTRATE QUALITY

This invention relates to a method for determining filtrate quality of fluids which have passed through a primary filter. More particularly, this invention relates to a method for controlling filtrate quality of the main filter.

Filters perform a very essential function in cleaning and maintaining cleanliness of fluids in many applications. Among such applications are swimming pools, water for human consumption, water for injection into wells producing hydrocarbons to facilitate production, production of wine and beer, sugars and syrups, and drug manufacture.

The efficiency of a filter depends in large part on maintaining a substantial flow through the filter while removing the particles suspended in the fluid. Such flow is impaired if the filter is permitted to plug with contaminants since all of the fluid from the stream of the filter then begins to back up, cause higher pressures, and can rupture or otherwise damage the filter.

It is therefore customary to clean the filter at intervals by means such as reversing the flow of fluid through the filter and discarding to waste, or if the fluid is obtained from a large reservoir by backwashing into the reservoir.

These backwashing operations have previously been controlled either manually, by automatic timers or by measuring differential pressures across the filter. When manually controlled, the backwashing was done without respect to time and sometimes was initiated when not required, and sometimes after the filter medium had been saturated beyond the level at which a backwash operation would normally be carried out.

Automatic backwashing has been attempted in the past by methods such as those exemplified in U.S. Pat. Nos. 3,452,586; 2,512,644; 3,948,773; 4,005,013; 3,717,251; 3,826,368; and U.S. Pat. No. 3,638,793. These methods, however, all deal with a method of determining when to backwash or otherwise clean the filter by monitoring the buildup of back pressure on the filter. These references deal primarily with the assemblies responsive to the buildup of the differential pressure ($\Delta P$) across the filter with increasing accumulation of contaminants on the filter. At a predetermined pressure, these methods automatically shift a reversing valve to effect a backwash operation of the filter for the necessary period of time.

However, these methods have several disadvantages. First, the pressure differential over the filter itself is measured, thus requiring the monitoring of an extremely large stream in many cases. Secondly, with many filters such as those of the diatomaceous earth type, backwashing operations not infrequently lead to faults in the filter system since diatomaceous earth filters are held upon a solid support by the pressure of the water flowing through them. Monitoring of the differential pressure therefore, does not reveal when the filter medium has seated or bridged improperly, or allowing a flow of unfiltered material through the filter. Thus the differential pressure does not actually measure filtrate quality.

It would therefore be of great benefit to provide a method whereby continuous monitoring of the filtrate quality is carried out and the objections of the prior art are avoided.

It is therefore an object of the present invention to provide a method and apparatus for the automatic control of filtrate quality. Other objects will become apparent to those skilled in this art as the description proceeds.

It has now been found that the objections to the prior art processes and apparatus can be overcome by utilizing an apparatus for controlling quality of a primary filter filtrate comprising (1) means for removing a sidestream from said filtrate, (2) passing said sidestream through means capable of maintaining constant flow, said means forcing said sidestream through (3) means for determining the pressure drop ($\Delta P$) from the upstream side to the downstream side of said monitoring filter, (4) together with means for backwashing said monitoring filter, said means being employed either,
 (a) at predetermined times independent of $\Delta P$ or
 (b) when the $\Delta P$ reaches a predetermined value, or
 (c) when the flow downstream of said monitoring filter falls below a predetermined value at a constant upstream pressure, (5) with means for stopping flow through said primary filter when the $\Delta P$ of (4) above begins the monitor filter backwash.

This apparatus will allow control of the quality of the filtrate and will not merely measure the differential pressure over the primary filter itself. The sidestream can be forced through the monitoring filter by using a means such as a pump or a motor valve or the two in combination.

Determination of when to backwash the monitor filter can be by any one of three methods. Initially, if the filtered quality of the main filter remains high, the main filter will not require backwashing. In the event that the filtered quality of the main filter remains relatively clean, the monitoring filter should be backwashed at periodic intervals in order to maintain its efficiency. This will obviate the necessity for backwashing the main filter on an automatic cycle and does not require a $\Delta P$ to be maintained over the main filter stream. When the $\Delta P$ over the monitoring filter reaches a predetermined value the monitor filter is backwashed. In this event, an indication of deterioration of filtered quality from the main filter is apparent and the main filter could be backwashed simultaneously with the monitoring filter at this time.

A third method measures the downstream flow of the monitor filter. When the filtrate slow downstream of said monitoring filter falls below a predetermined value at a constant upstream pressure, the monitoring filter has become plugged sufficiently to impair its efficiency. At this point, backwashing of the monitoring filter could be initiated, either with or without simultaneous backwashing of the main filter.

The monitoring filter of the instant invention can be of any type depending upon the apparatus and the process to which it is adapted. However, for most processes the most preferred monitoring filter would be porcelain, glass, brass, steel or stainless steel in sintered form. These materials would have nominal size of about 2 to 7 microns for most applications, although it will be realized that for some applications larger nominal sizes will be effective. Representative examples of such sintered filters are those sold under the Trademark "Rigimesh" by Pall Trinity Micro Corporation, Cortland, N.Y. These filters are graded by a nominal filtration rating which is a arbitrary micrometer value indicated by filter manufacturers. This value is based upon removal of some percentage of all particles of a given size or larger. This value, however, is not well defined and is usually not reproduceable. Pall ratings reflect a higher than average 98% removal by weight.

Thus it is apparent that the apparatus described above is useful in a method for determining filtrate quality of a fluid stream which is passed through a primary filter, the method comprising
 (a) removing a sidestream of liquid downstream of said filter,
 (b) passing said sidestream through a means capable of maintaining constant flow,
 (c) passing the stream from said constant flow means through a monitoring backwashable filter of appropriate pore size,
 (d) determining the $\Delta P$ over the monitoring filter,
 (e) while regenerating or replacing the primary filter when the $\Delta P$ across the monitoring filter reaches unacceptable levels in a predetermined cycle time.

It should be noted that portion b of the method can be carried out by determining back pressure or by means of maintaining a constant pressure upstream of the monitoring backwashable filter and determining the flow rate downstream such as by the use of a turbine. It should also be realized that the method described wherein the monitoring filter is backwashed can be carried out when the $\Delta P$ is insufficient to regenerate the primary filter in a predetermined length of time. This time is independent of the $\Delta P$ and is usually monitored by a timer.

The instant invention has a large advantage over the prior art in that only from about 0.01 to about 4% of the primary filter filtrate stream need be tested, thus obviating the need for testing large volumes of material. The precise amount of the filtrate which must be sidestreamed to the monitoring filter will depend upon a particular application. In addition, the pressure on the monitoring filter and particularly changes in $\Delta P$ occur more rapidly because of the smaller filter area and can be more accurately determined because the smaller filter is less subject to have fluccuations than the main filter. Pressures of from about 0.1 to about 75 pounds per square inch gauge (psig) are tested but from about 2 to about 20 pounds will be the usual range used. Alternative methods of backwashing the monitoring filter are by maintaining constant pressure above the filter and controlling backwash based upon the flow rate changes measured by a turbine or other meter. When an independent time is used a time of from about 2 minutes to about 1 hour is preferred.

The FIGURE shows the preferred embodiment of the invention.

The invention is more concretely described with reference to the FIGURE wherein a model monitoring filter system is shown. The inlet 1 for the main feed stream leads to the main filter wherein the product feed is introduced in the system. In the example, the inlet feed flows into a diatomaceous earth filter 10 having at the bottom a dump line 2 to a disposal pit for backwashing purposes. The valve 3 sealing the dump line from the filter opens only when backwashing the main filter, while a valve 19 in the inlet line closes, sealing the backwash from the product stream. Material passing through the filter goes down the product line to the main tank through a line 4. A slipstream comprising under 5% of the main product stream is removed through a line 5 which passes through a pump 6, valves 7 and 8, and then into a monitoring filter 9. A differential pressure meter 11 monitors both the upstream and downstream side of the monitoring filter 9. Fluids passing through the monitoring filter pass through valve 12 and into an optional turbine flow meter 13 which will measure rate flow. Material passing through the turbine can then be returned to the product line 4 or directed to the waste pit through the dump line 2. Valves 20 and 21 are mutually opposed and control flow of filtrate downstream of the monitor filter. When the higher volumes of sidestream are taken from the product stream, it would of course be more economical to return the material which passes the monitoring filter to the main product line if of acceptable quality. During operation of the monitoring filter, valves 15 and 16 will be closed. Valve 15 seals off an air discharge line during normal operation. Valve 16 is an air inlet for backwashing or backblowing the monitor filter and is normally closed during normal operations. Valves 7, 8, and 12 are open during monitoring of the normal operation stream.

An electropnuematic controller 17 is shown to supply air to valve 7 to stop the normal flow and begin the backwashing operations when the filter is determined to be impaired by any one of several methods or the minimum length of time without backwashing has passed. At the time of backwashing the electronic control panel will direct the closings of valves 7, 8 and 12 and the opening of valves 15 and 16 while directing a countercurrent stream of liquid or air through the disc to remove the contaminating particles. The air or liquid which has passed through the monitoring filter exits via lines 23. This procedure can be initiated either by a high differential pressure across the monitoring discs, a low downstream flow as determined by the turbine flow meter 13 or by a minumum length of time which has passed, independent of either the $\Delta P$ as registered by a differential pressure meter 22, or the downstream flow. In the case of the independent minimum time, no triggering of the main filter regeneration occurs. However, when the monitoring filter is backwashed as a result of the higher $\Delta P$ across the filter, or by a low downstream turbine flow, the control package will open valve 3, close valve 19 and backwash the main diatomaceous earth filter concurrently with the regeneration or backwashing of the monitoring filter.

When the pressure on the monitoring filter is high or the downstream flow is low, the electronic controller will shut off the flow to the clean well tank, completely open the bypass of the raw storage tank, and regenerate for a minimum predetermined number of backwashed cycles. Several variations are possible in control logic. For example, if the $\Delta P$ or the downstream flow is still unacceptable after the backwash cycles, then the electronic package would initiate the backwashing of the monitoring filter until adjustment is reached and/or signal filter failure to an operator. When the $\Delta P$ is high across the monitoring filter after the initial backwash, the electronic control package can compare the flow rate through the turbine meter to the $\Delta P$. If the flow ratio to $\Delta P$ is unacceptable, the main product will be returned to the raw supply tank and the monitoring filter will be again backwashed.

The equipment and control systems described herein are generally known to those skilled in this art as individual apparatus. For example, turbines such as described are manufactured by Halliburton Services, Duncan Oklahoma and Foxboro Company, Foxboro Mass. Control valves can also be obtained from Foxboro Company, and Fisher Governor Company, Marshalltown, Iowa. Electronic Controls can be made for each system as desired using methods known to those skilled in the electronics art.

It is apparent that the method and apparatus of the instant invention provides many advantages over the prior art processes in that a large volume of fluid need not be constantly monitored. In addition, the detection is extremely accurate since only the previously filtered material is monitored and $\Delta P$ is not subject to fluctuations which occur in streams of large volume. In addition, alternate methods for determining the contamination of the monitoring filter have been provided. The system also provides a fail-safe for large filter failure which normal pressure differential gauges cannot detect.

While certain embodiments and details have been shown for the purpose of illustrating this invention, it will be apparent to those skilled in this art that various changes and modifications may be made herein without departing from the spirit or the scope of the invention.

We claim:

1. A method for determining filtered quality of a fluid stream which has passed through a primary filter the method comprising
   (a) removing a sidestream of liquid which has passed through said filter,
   (b) passing said sidestream through a means capable of maintaining constant flow,
   (c) passing the stream from said constant flow means through a monitoring backwashable filter of appropriate pore size,
   (d) determining the pressure drop ($\Delta P$) over the monitoring filter, and thereby determining the quality of said filter stream,
   (e) regenerating or replacing the primary filter when the $\Delta P$ for the monitoring filter reaches unacceptable levels 2. A method as described in claim 1 wherein the monitoring filter is backwashed when the $\Delta P$ is insufficient to regenerate the primary filter in a predetermined length of time, said time being independent of $\Delta P$.

3. A method as described in claim 2 wherein the $\Delta P$ is determined by measuring pressure above and below the monitoring filter.

4. A method as described in claim 6 wherein the primary filter can be regenerated at a $\Delta P$ of from about 0.1 to about 75 psig.

5. A method as described in claim 2 wherein $\Delta P$ is determined by maintaining constant pressure above the monitoring filter and determining flow rate below the monitoring filter.

6. A method as described in claim 2 wherein the monitoring filter is a sintered material comprising porcelain, glass, brass, steel, or stainless steel.

7. A method as described in claim 6 wherein the pore openings of the monitoring filter have a nominal size of 2-7 microns.

8. A method as described in claim 6 wherein the sidestream comprises from about 0.01 to about 4% of the primary filter filtrate stream.

9. A method as described in claim 2 wherein an independent time of from about 2 minutes to about 1 hour is used.

10. An apparatus for controlling quality of a primary filter filtrate comprising
    (1) means for removing a sidestream from said filtrate, which has passed through a filter,
    (2) passing said sidestream through means capable of maintaining constant flow, said means forcing said sidestream through,
    (3) means for determining pressure drop ($\Delta P$) from the upstream side to the downstream side of said monitoring filter, and determining the quality of said filtrate,
    (4) means for backwashing said monitoring filter, said means being employed either
        (a) at predetermined time independent of P or
        (b) when $\Delta P$ reaches a predetermined value or
        (c) when the flow downstream of said monitoring filter falls below a predetermined value at controlled upstream pressure and
    (5) means for stopping flow through said primary filter when $\Delta P$ of 4 begins the monitor filter backwash.

11. A apparatus as described in claim 10 wherein the means capable of maintaining constant flow as a motor valve and/or a pump apparatus.

12. An apparatus as described in claim 11 wherein the valves are controlled by a pneumatic air apparatus.

13. An apparatus as described in claim 10 wherein the means of measuring flow is a turbine.

14. An apparatus as described in claim 13 wherein all monitoring of controlled devices is controlled by a single electronic package.

* * * * *

UNITED STATES PATENT OFFICE
CERTIFICATE OF CORRECTION

PATENT NO. : 4,107,037

DATED : August 15, 1978

INVENTOR(S) : Robert J. Cavanaugh, Robert L. Coffee, Dell Conley and Howard H. Ferrell It is certified that error appears in the above-identified patent and that said Letters Patent are hereby corrected as shown below:

Column 6, line 1, "6" should be --3--.

Signed and Sealed this

Sixth Day of March 1979

[SEAL]

Attest:

RUTH C. MASON
*Attesting Officer*

DONALD W. BANNER
*Commissioner of Patents and Trademarks*